United States Patent [19]
Durkee et al.

[11] 3,792,626
[45] Feb. 19, 1974

[54] VEHICLE STEERING COLUMN INSTALLATION

[75] Inventors: Lyle H. Durkee, Hemlock; Gail M. Cunningham, Frankenmuth, both of Mich.

[73] Assignee: General Motors Corporation, Detroit, Mich.

[22] Filed: Dec. 22, 1972

[21] Appl. No.: 317,726

[52] U.S. Cl. .................................... 74/492, 248/293
[51] Int. Cl. ............................................. B62d 1/18
[58] Field of Search 74/492, 493; 248/293; 292/216

[56] References Cited
UNITED STATES PATENTS

| | | | |
|---|---|---|---|
| 806,612 | 12/1905 | Alden | 74/493 |
| R27,390 | 6/1972 | Allen | 292/216 X |
| 805,944 | 11/1905 | Clark | 74/493 |
| 1,347,611 | 7/1920 | Blenko | 248/293 |
| 2,185,779 | 1/1940 | Tveidt | 74/493 |
| 3,533,302 | 10/1970 | Hansen | 74/493 |
| 3,724,290 | 4/1973 | Burton | 74/493 |

FOREIGN PATENTS OR APPLICATIONS

1,187,505  2/1965  Germany ............................ 74/493

Primary Examiner—Allan D. Herrmann
Attorney, Agent, or Firm—Saul Schwartz

[57] ABSTRACT

A vehicle steering system wherein the steering column assembly is adapted for simplified and accurate installation on the body portion of the vehicle, the system including a yoke at the lower end of the steering column assembly defining a pair of trunions, a pair of receptacles on the body portion for receiving the trunions to support the column assembly on the body portion for pivotal movement to a fully installed position, a striker on the body portion, and a latch bolt on the steering column adapted for automatic latching engagement on the striker when the steering column assembly achieves the fully installed position thereby to maintain the column assembly in the fully installed position.

6 Claims, 8 Drawing Figures

VEHICLE STEERING COLUMN INSTALLATION

This invention relates generally to vehicle steering systems and more particularly to the attachment of the steering column assembly portion of the system to the body of the vehicle.

Typically, a steering column assembly for a modern automobile is an elongated structure having a substantial mass concentration at the hub or steering wheel end and includes a pair of outer tube or mast jacket sections adapted for telescopic collapse in an energy absorbing mode. To adequately support the column assembly, and particularly the hub end, on the body of the vehicle, the lower end of one of the mast jacket sections is usually anchored to the fire wall or bulkhead portion of the body while the other of the mast jacket sections is bolted to reinforcing members behind the instrument panel through releasable fasteners which permit collapse of the column assembly under impact but which rigidly support the hub end of the column assembly during normal operation. As might be expected, installing the column assembly during assembly of the vehicle is a time consuming and, therefore, expensive operation. A vehicle steering system according to this invention incorporates a steering column assembly which is significantly eaiser to install on the body and which is automatically correctly aligned during installation.

The primary feature, then, of this invention is that it provides an improved vehicle steering system wherein the steering column assembly is adapted for rapid and simplified attachment to the body portion of the vehicle. Another feature of this invention resides in the provision on the column assembly and on the body portion of a guide and follower arrangement for effecting accurate and automatic alignment of the column portion during the installation procedure. Yet another feature of this invention resides in the provision on the column assembly and on the body portion of a socket and receptacle arrangement for effecting a pivotal connection between the base of the column assembly and the body portion and in the provision of a latch and striker arrangement for effecting automatic support of the hub end of the column assembly on the body portion when the assembly is pivoted toward the instrument panel. Still another feature of this invention resides in the provision of a latch which when engaged on the striker provides an opening whereby the latch and striker are relatively separable in a direction parallel to the longitudinal axis of the steering column assembly thereby to permit longitudinal collapse of the column assembly under impact. A still further feature of this invention resides in the provision of a guide on the body portion adapted for closely receiving a projection on the column assembly to accurately align the column assembly while still permitting longitudinal collapse of the latter.

These and other features of this invention will be readily apparent from the following specification and from the drawings wherein.

Figure 1:
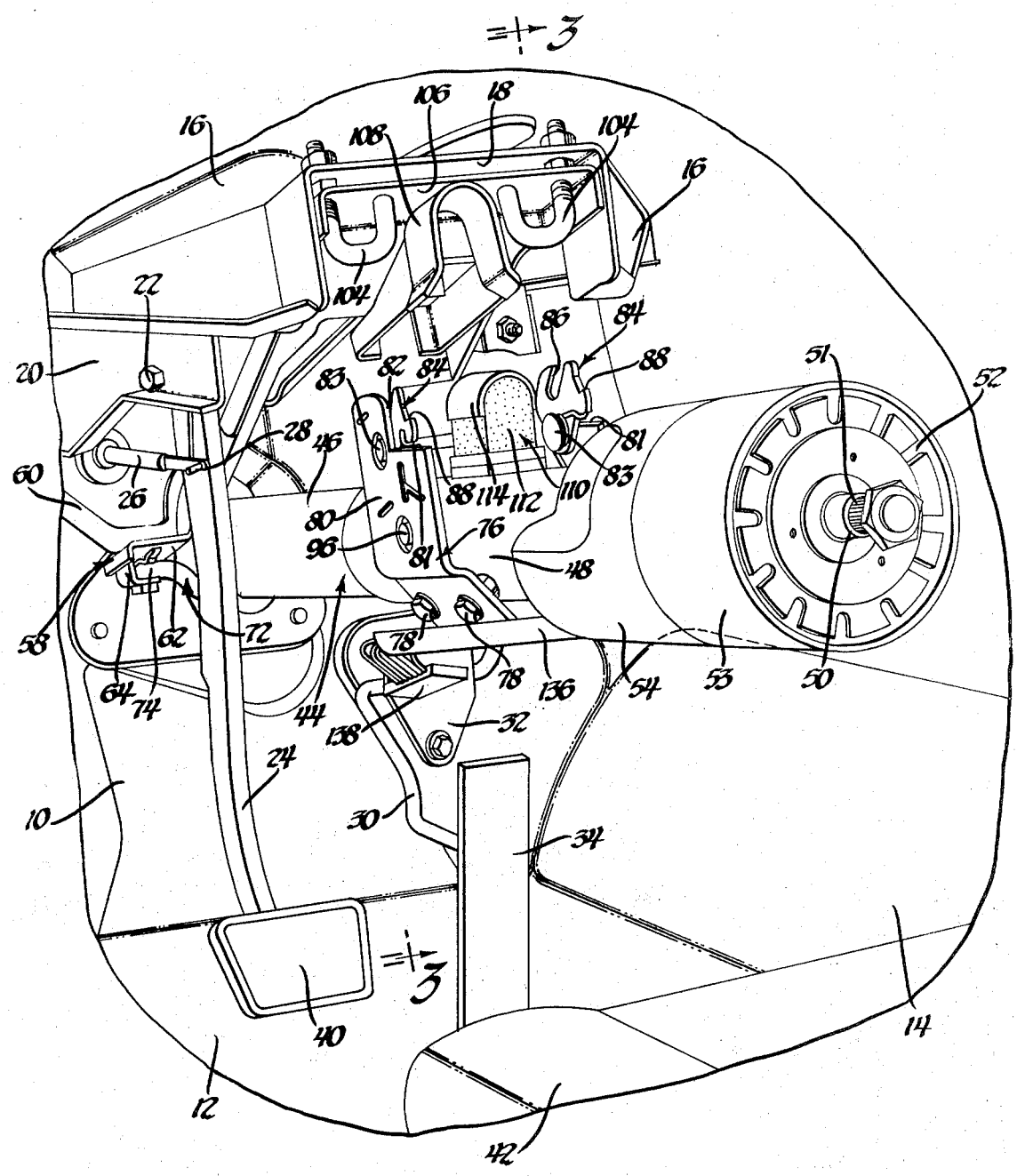
FIG. 1 is a fragmentary perspective view of the forward interior section of the body portion of an automobile type vehicle and incorporating a steering system according to this invention and showing the steering column assembly in a semi-installed position.
Figure 2:
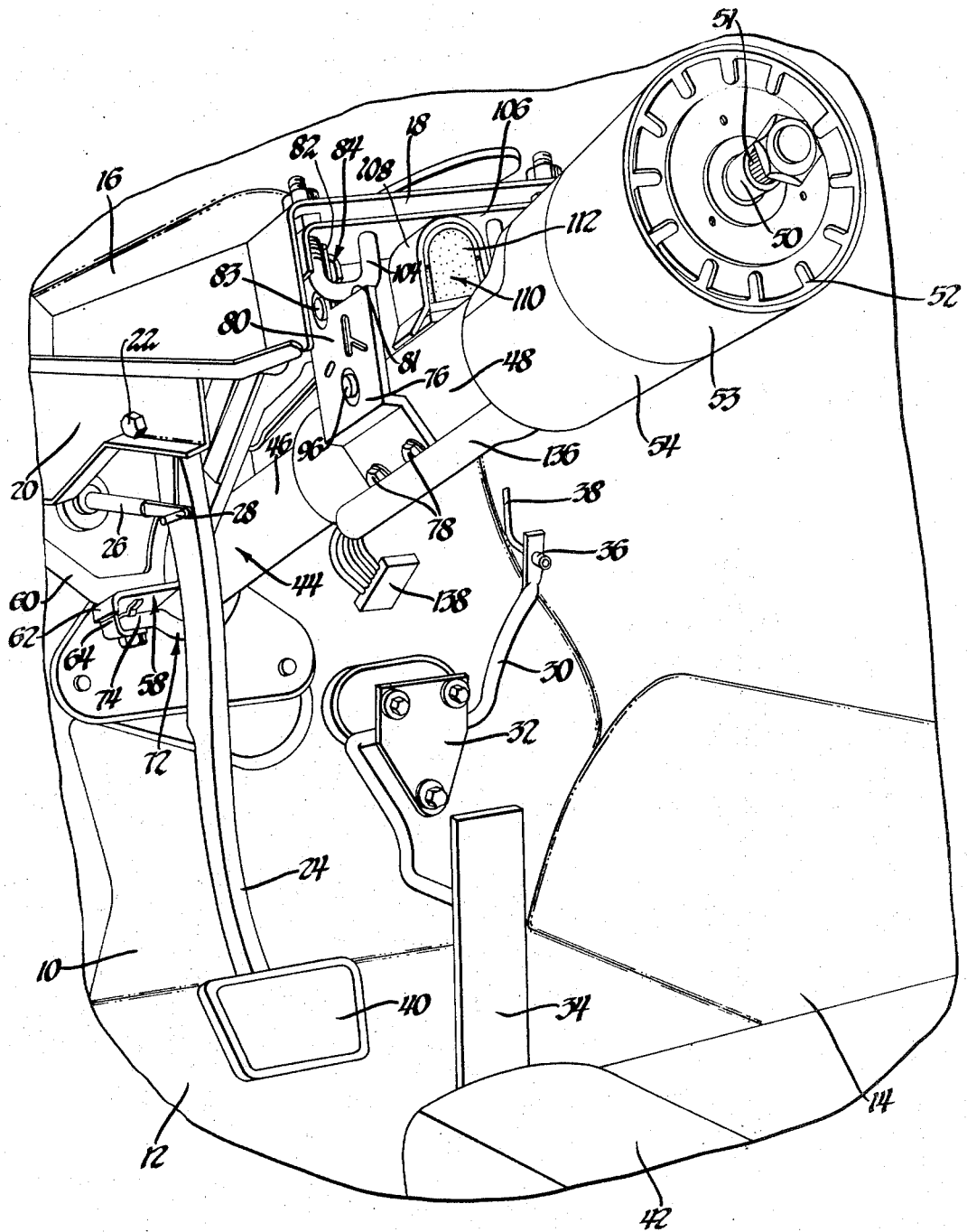
FIG. 2 is similar to FIG. 1 but showing the steering column assembly in a fully-installed position.

Referring now to the drawings, FIGS. 1 and 2 depict the forward section of the interior of the body portion of an automobile type vehicle, the body portion being defined at the forward end by a fire wall or bulkhead 10 which merges with a floor panel 12 inclduing a transmission tunnel 14. The fire wall 10 projects upwardly from the floor 12 and has rigidly attached thereto a pair of braces 16 defining a longitudinally extending channel-shaped enclosure 18. Another brace 20 projects rigidly from the fire wall 10 and pivotally supports at 22 a brake pedal 24. A push rod 26 projects through the fire wall 10 and has one end, not shown, connected to a conventional brake master cylinder assembly and the other end pivotally connected at 28 to the brake pedal 24. An accelerator control bellcrank 30 is pivotally supported on the fire wall 10 by a bracket 32 and has a conventional accelerator pedal pad 34 disposed on one end thereof, the other end of the bellcrank being connected at 36, FIG. 2, to one end of a throttle control cable 38. The accelerator pedal pad 34 and a pad 40 disposed on the end of the brake pedal 24 are adaped to be actuated by the foot of the operator of the vehicle seated on a seat 42, the seat being mounted on the floor 12 through a conventional adjuster arrangement, not shown. A steering column assembly designated generally 44 is disposed between the seat 42 and the fire wall 10 and represents a portion of a vehicle steering system according to this invention, the remainder of the steering system including a conventional manual or power assisted steering gear, appropriate steering linkage and the like, not shown.

Referring particularly now to FIGS. 1 through 5, the column assembly 44 includes a lower mast jacket section 46, an upper mast jacket section 48 and a steering shaft 50. The steering shaft is rotatably journaled within the mast jacket sections and functions to transfer steering torque from a steering wheel, not shown, disposed on a knurld end portion 51 of the steering shaft to a conventional flexible coupling, not shown, connected to the input shaft of the steering gear. The upper mast jacket section is adapted for telescopic bodily movement relative to the lower mast jacket section in an energy absorbing mode when the column assembly is subjected to a compressive impact, the steering shaft 50 also being adapted for simultaneous longitudinal collapse. At its outboard end adjacent the knurled portion 51 of the steering shaft, the column assembly 44 includes a hub portion 52 which is surrounded by a rotatable shift bowl 53 and a stationary skirt 54. The hub portion 52 houses the steering shaft bearings, the ignition and steering lock arrangement, the turn signal switch assembly and the like while the shift bowl 53 supports the transmission range selector lever, not shown.

As seen best in FIGS. 1, 2, 3, 7 and 8, the lower mast jacket section 46 projects through an aperture 55 in the fire wall 10, the clearance space between the mast jacket section 46 and the aperture 55 being sealed by a boot 56. A bracket 58, FIG. 7, in the form of an inverted channel is rigidly supported above the lower mast jacket section 46 inboard of the fire wall by appropriate bracing members 60, FIGS. 1 and 2, and includes a pair of transverse flanges 62. Each of the flanges 62 has rigidly attached thereto an L-shaped member 64 which cooperates with the corresponding one of the flanges 62 in defining a pair of channels extending parallel to the longitudinal axis of the steering column assembly 44. A pair of stop pins 66, FIGS. 7 and 8, project vertically between the flanges 62 and the members 64 to obstruct passage through the channels defined thereby. A spring clip 68 is disposed on each of the flanges 62 of the bracket 58 and retained against longitudinal movement by the stop pin 66 and a crimped over portion 70 of the clip.

As seen best in FIGS. 1, 2, 7 and 8, a yoke 72 is rigidly attached to the lower mast jacket section 46, as by welding, and includes a pair of trunions 74 extending laterally in opposite directions in a plane perpendicular to the longitudinal axis of the steering column assembly. Each of the trunions is adapted to be received in a corresponding one of the channels defined by the flanges 62 and the members 64, the trunions abutting the stop pins 66 and being retained thereagainst by the spring clip 68, FIG. 8. The trunions 74 are circular in cross-section, FIG. 8, so that the members 64 and flanges 62 cooperate with the trunions in supporting the lower mast jacket section 46, and hence the steering column assembly, on the body portion of the vehicle for pivotal movement about an axis defined by the trunions between a semi-installed position shown in FIG. 1 and in solid lines in FIG. 3, and a fully-installed position, shown in FIG. 2 and in broken lines in FIG. 3.

Referring now to FIGS. 1, 2, 3, 5 and 6, a generally u-shaped latch support member 76 is rigidly attached to the upper mast jacket section 48 by a plurality of conventional, threaded fasteners 78 and includes a pair of parallel, laterally spaced wall portions 80. Each wall portion 80 terminates at the top in a generally horizontal edge 81, the edge 81 intersecting a perpendicular vertical edge 82 formed on each wall portion 80.

One of a pair of rivets 83 projects rigidly from each wall portion and rotatably supports a respective one of a pair of fork type latch bolts 84. As seen best in FIG. 6, each latch bolt 84 includes a mouth portion 86 and a shoulder 88. A torsion spring 90 is coiled about each of the rivets 83 and bears at one end against a corresponding one of the latch bolts 84 and at the other end against an arm portion 92 of a respective one of a pair of detent levers 94, each of the detent levers 94 being pivotally supported on a respective one of a pair of rivets 96 projecting rigidly from the corresponding one of the wall portions 80. The springs 90 bias the latch bolts 84 in a counterclockwise direction, FIG. 6, from a latched position to an unlatched position, shown respectively in broken and solid lines in FIG. 6. Similarly, the springs 90 bias the detent levers 94 in a counterclockwise direction toward a detenting position, FIG. 6, wherein a shoulder 98 on each detent lever engages the corresponding shoulder 88 to retain the latch bolts in the latched position. The detent levers, of course, are pivotable from the detenting position to a releasing position, not shown, wherein the shoulders 98 lie remote from the shoulders 88 thereby to release the latch bolts for pivotal movement to the unlatched position. Further, each latch bolt includes a cam 100 which is engageable on a corresonding cam portion 102 on each detent lever during movement of the latch bolts from the unlatched to the latched position, the cams 100 functioning to pivot the detent levers 94 clockwise out of the detenting position until the shoulders 88 pass beyond the shoulders 98 whereupon the springs 90 rotate the detent levers back to the detenting position. The latch bolts 84 are adapted for latching engagement on corresponding ones of a pair of U-bolt strikers 104, FIGS. 1 and 2, rigidly attached to the braces 16 within the channel-shaped enclosure 18 defined thereby.

As seen best in FIGS. 1 and 2, the channel-shaped enclosure 18 defined by the braces 16 has disposed therein an inverted channel-shaped plate 106 which has rigidly attached thereto an alignment guide 108 in the form of an inverted U. The alignment guide is adapted to receive a complementary alignment projection 110 rigidly attached to the upper mast jacket section 48 of the steering column assembly, the alignment projection including a resilient body portion 112 and a wear plate 114.

The hub portion 52 of the steering column assembly 44 is generally conventional in construction and may include a coincidental ignition, steering and transmission lock. For a full and complete description of a satisfactory coincidental lock, reference may be made to U.S. Pat. No. 3,490,255, issued to Wight et al on Jan. 20, 1970 and assigned to the assignee of this invention. Generally, however, the coincidental lock includes a slide bolt 116, FIG. 3, which reciprocates longitudinally of the hub portion 52 in response to rotation of a key in the ignition lock, not shown, mounted on the hub portion. A rod 118 is connected at one end to the bolt 116 at 120 and at the other end to a contact element, not shown, disposed within an ignition switch 122, the switch being rigidly attached to the upper mast jacket section 48 through a plurality of connectors adapted for fracture at a predetermined shear force level. The switch includes a plurality of receptacle-type electrical contacts, not shown, which are adapted to receive a corresponding plurality of pin-type contacts, not shown, disposed on a terminal block 124 attached to a structurally rigid part of the body portion. The terminal block 124 is connected through conventional conductive leads to the appropriate vehicle components such as the engine starter motor. Accordingly, when the rod 118 reciprocates, the various conductive leads are energized to achieve normal vehicle operation.

Referring again to FIG. 3, the hub portion 52 further includes a turn signal switch assembly 126 responsive to actuation of a conventional turn signal lever, not shown, mounted on the hub portion. For a full and complete description of an appropriate turn signal switch assembly, reference may be made to U.S. Pat. No. 3,510,839, issued on May 5, 1970, in the name of Elliott et al and assigned to the assignee of this invention. The switch assembly, of course, includes a plurality of conductive leads which are arranged to terminate at a connector 128 attached to the switch assembly.

The connector 128 includes an elongated keying projection 130 which extends parallel to the longitudinal axis of the steering column assembly in the annular space between the upper mast jacket section and the skirt 54. The keying projection 130 is non-circular in transverse cross-section and includes a retaining lip 132. The keying projection is adapted to function as a key and a guide for a connector 135 which has a wire harness 136 attached thereto. The connector 134 is adapted to fit over the projection 130 and to slide therealong between the upper mast jacket section and the skirt until mating connection is achieved with the connector 128. The wire harness 136 has a third connector 138, FIGS. 1 and 2, attached thereto which is adapted for simple plug-in connection with a similar connector remote from the hub.

Figure 3:
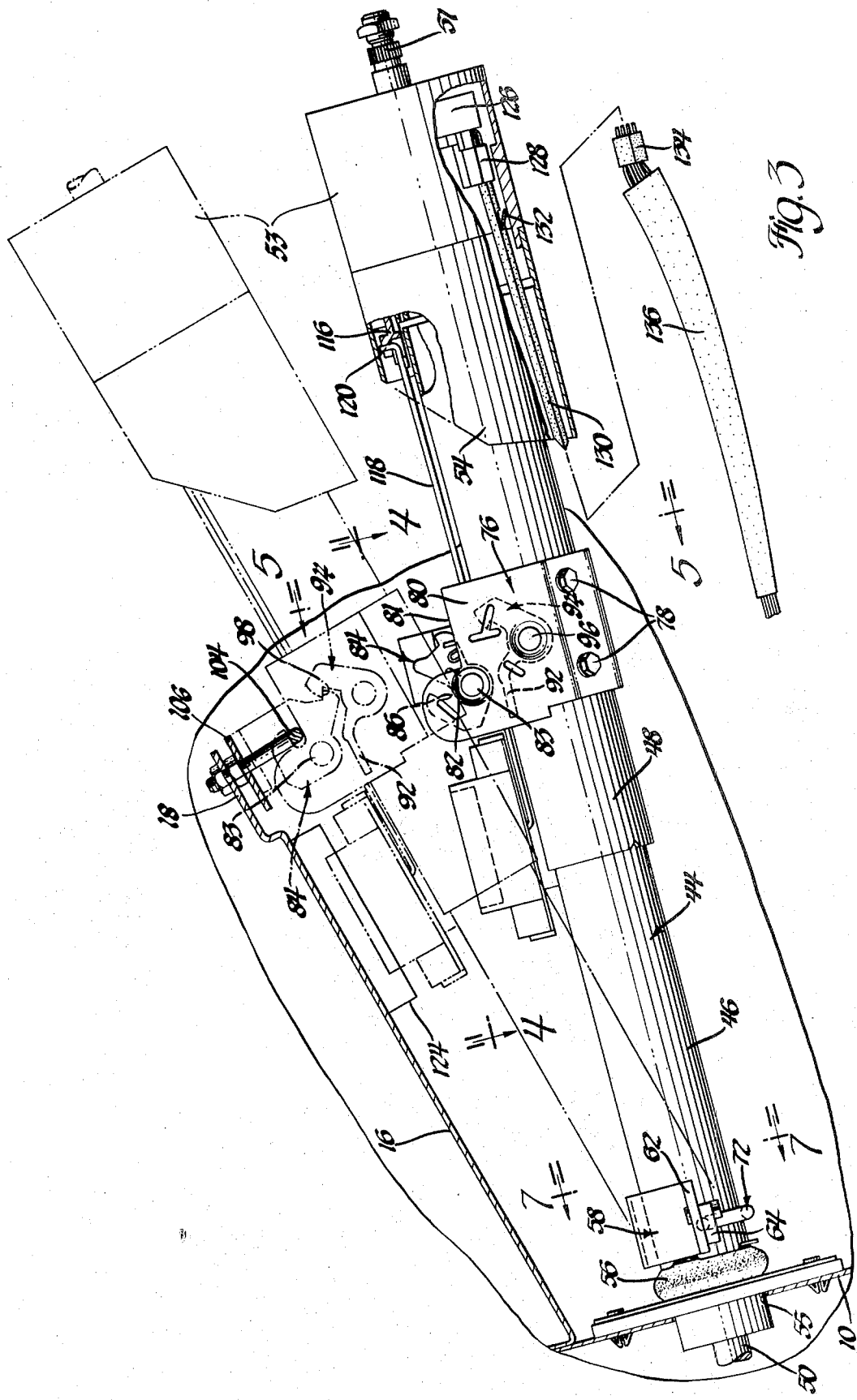
FIG. 3 is a partially borken away view taken generally along the plane indicated by lines 3—3 in FIG. 1 and showing the steering column assembly in the semi-installed and the fully-installed positions in solid and broken lines respectively.
Figure 4:
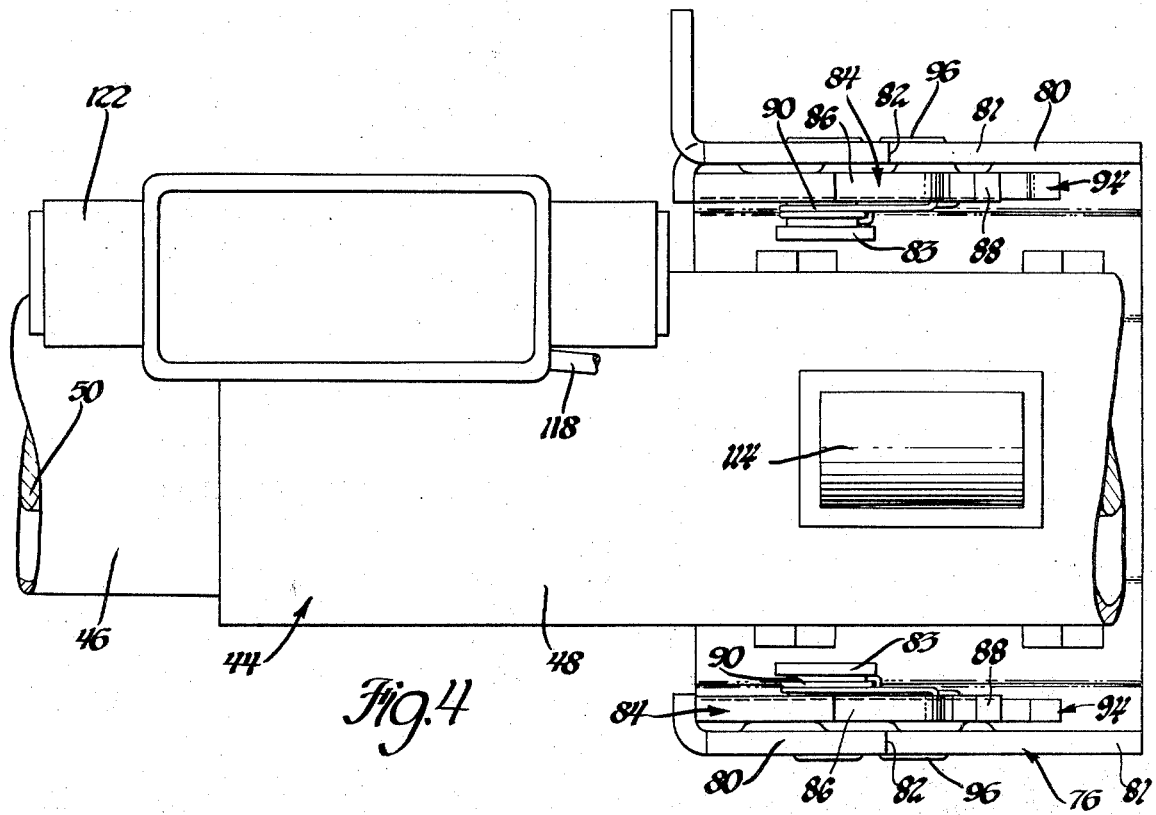
FIG. 4 is an enlarged view taken ganerally along the plane indicated by lines 4—4 in FIG. 3.
Figure 5:
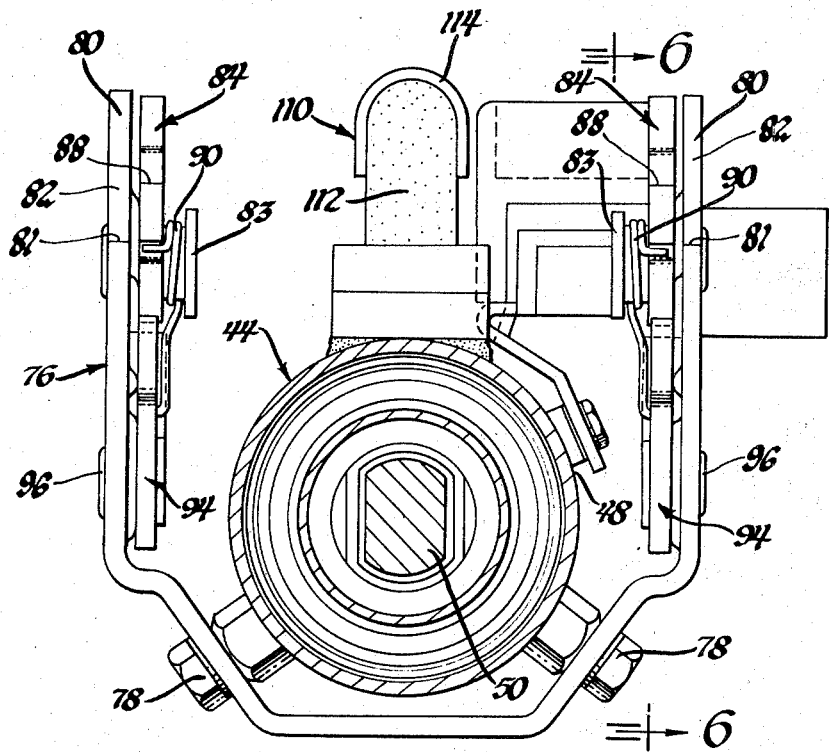
FIG. 5 is an enlarged sectional view taken generally along the plane indicated by lines 5—5 in FIG. 3.

The steering column assembly and associated structure described hereinbefore are particularly intended to simplify and accelerate installation of the column assembly in the vehicle. The installation procedure, of course, begins with the column assembly out of the vehicle and the latch bolts 84 in the unlatched position under the influence of the springs 90. The lower or left end of the column assembly, FIG. 3, is inserted in the aperture 55 in the fire wall and moved forwardly of the body portion unitl the trunions 74 enter the channels defined by the members 64 and the flanges 62 whereupon the trunions are thrust past the spring clips and into engagement on the stop pins 66, the pins defining the furthest forward position of the column assembly. At this stage of the installation procedure the column assembly assumes the semi-installed position, shown in solid FIG. 3 and in FIG. 2, disposed substantially below the strikers 104.

Figure 6:
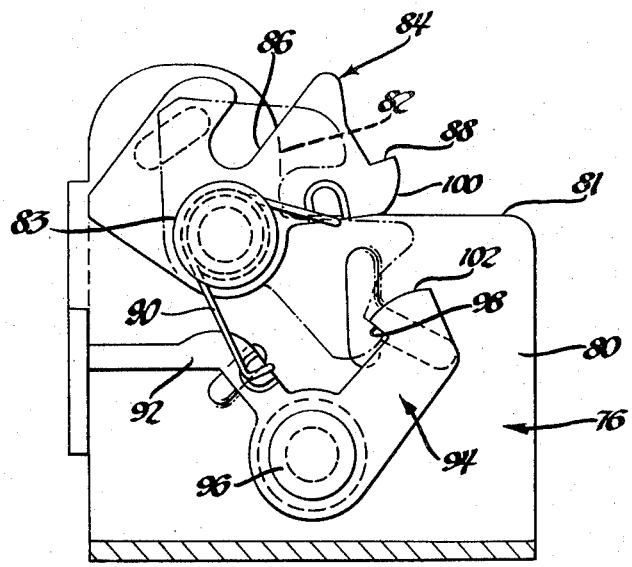
FIG. 6 is a sectional view taken generally along the plane indicated by lines 6—6 in FIG. 5.
Figure 7:
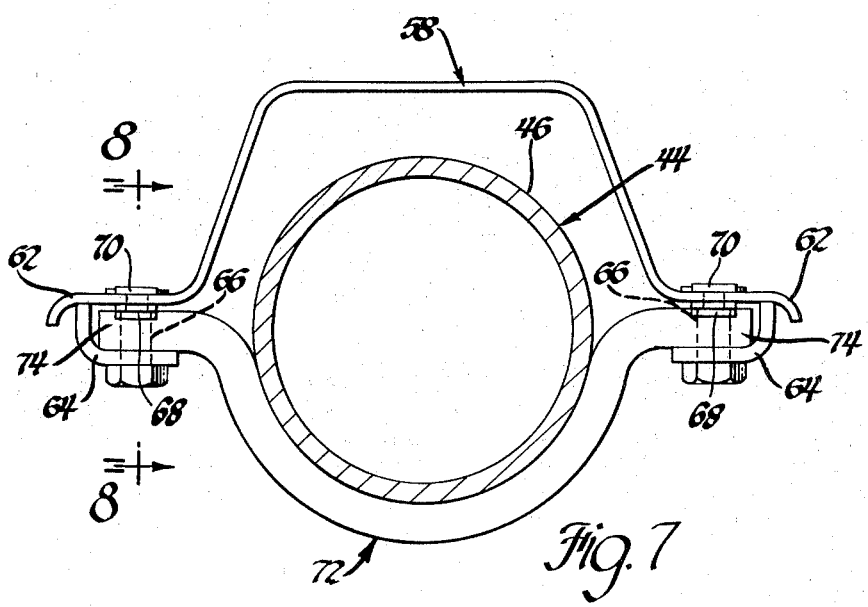
FIG. 7 is an enlarged sectional view taken generally along the plane indicated by lines 7-7 in FIG. 3.
Figure 8:
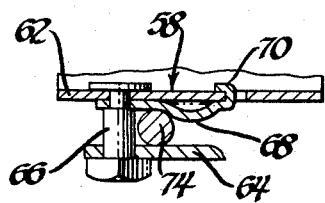
FIG. 8 is a sectional view taken generally along the plane indicated by lines 8—8 in FIG. 7.

As seen best in FIGS. 3 and 6, the longitudinal distance on the steering column assembly between the trunions 74 and the vertical edges 82 on the latch support member is relatively closely controlled and is slightly greater than the distance between the stop pins 66 and the strikers 104 on the body portion of the vehicle. Accordingly, as the steering column assembly is pivoted counterclockwise, FIG. 3, about the axis defined by the trunions 74 from the semi-installed position toward the fully-installed position, the curved upper portions of the vertical edges 82 engage the strikers so that the wall portions 80 wedge slightly against the strikers to eliminate any looseness between the column assembly and the body portion of the vehicle.

As the steering column assembly approaches the fully-installed position, the strikers are received in the mouth portions 86 of the latch bolts 84, the bolts then being rotated by the strikers from the unlatched to the latched position. The bolts each achieve the latched position at substantially the instant the strikers contact the horizontal edges 81 of the wall portion 80 whereupon the shoulders 98 on the detent levers 94 engage the shoulder 88 on the latch bolts to retain the steering column assembly in the fully-installed position. Of course, should it be necessary to lower the steering column assembly from the fully installed position, the arm portions 92 of the detent levers may be grasped and actuated to pivot the detent levers to the releasing position.

Simultaneously with movement of the column assembly to the fully installed position, the alignment projection 110 enters the alignment guide 108 to effect transverse alignment of the steering column assembly. The resilient body portion 112 of the projection cushions the engagement between the latter and the guide 108 while the wear plate 114 functions to protect the resilient body portion against excessive abrasion. Similarly, as the column assembly approaches the fully installed position, the switch 122 engages the terminal block 124. When the fully installed position is achieved the electrical contacts on the switch and on the terminal block are firmly engaged so that subsequent actuation of the coincidental lock on the hub portion 52 effects energization of the appropriate electrical circuits of the vehicle.

The steering column assembly 44, as recited hereinbefore, is adapted for telescopic collapse in an energy absorbing mode when subjected to a longitudinal compressive impact. The trunions 74 anchor the lower end of the lower mast jacket section 46 on the body portion of the vehicle to prevent bodily movement in the direction of telescopic collapse. As seen best in FIG. 3, when the latch bolts 84 are in the latched position the mouth portions 86 capture corresponding ones of the strikers 104 to hold the column assembly in the fully-installed position. The mouth portions, however, are oriented such that each opens toward the rear of the vehicle. Accordingly, while vertical movement of the upper mast jacket section is foreclosed, the latter can be shifted longitudinally in the direction of telescopic collapse or toward the front of the body portion of the vehicle. Similarly, as best seen in FIG. 1, the alignment guide 108 is open at both ends so that bodily shiftable movement of the alignment porjection 110 with the upper mast jacket section is not obstructed. Finally, the ignition switch 122 attached to the upper mast jacket section 48 is adapted to shear away from the latter during collaspe of the column assembly thereby creating no obstruction to such collapse.

Conversely, in the event of an impact at the steering gear or lower end of the steering column assembly which might tend to force the latter rearwardly of the body portion of the vehicle, the trunions 74 are adapted to snap out of the channels defined by the flanges 62 and the members 64. The vertical edges 82 on the wall portions 80, however, prevent bodily movement of the upper mast jacket section 48 rearwardly of the vehicle body. Accordingly, in the event of a rearwardly directed impact, the column assembly is adapted to collapse along its longitudinal axis but in the opposite direction without the upper mast jacket section penetrating further into the interior of the body portion of the vehicle.

As the final step in the column assembly installation procedure, the connector 134 is centered on the projection 130 of the turn signal connector 128 and shifted along the projection until engagement between the two connectors 128 and 134 are achieved. The projection 130 orients the connector 134 in the proper position to achieve a proper albeit blind connection with the connector 128 while the tab 132 prevents inadvertent withdrawal of the connector 128 from the hub.

Having thus described the invention, what is claimed is:

1. In a vehicle including a body portion, the combination comprising, a collapsible steering column assembly including a lower mast jacket section and an upper mast jacket section disposed on said lower section for telescopic collapse in an energy absorbing mode, means supporting one end of said lower mast jacket section on said body portion for pivotal movement between a semi-installed position and fully-installed position, means on said body portion and on said lower mast jacket section adapted to prevent longitudinal bodily shiftable movement of said lower mast jacket section in the direction corresponding to relative telescopic collapse of said upper mast jacket section, striker means dispossed on one of said body portion and said upper mast jacket section, latch means disposed on the other of said body portion and said upper mast jacket section and adapted for automatic latching engagement on said striker means in response to pivotal movement of said steering column assembly from the semi-installed position to the fully installed position thereby to maintain said steering column assembly in the fully-installed position, and means disposed between said upper mast jacket section and in said body portion adapted for permitting longitudinal bodily shiftable movement of said upper mast jacket section in the direction of relative telescopic collapse thereof when said steering column assembly is in the fully-installed position.

2. In a vehicle including a body portion, the combination comprising, a collapsible steering column assembly including a lower mast jacket section and an upper mast jacket section disposed on said lower mast jacket section for telescopic collapse in an energy absorbing mode, means disposed on said lower mast jacket section generally adjacent one end thereof defining a pair of rigid trunions on opposite sides of said lower mast jacket section oriented along an axis generally normal to the longitudinal axis of said steering column assembly, receptacle means disposed on said body portion and adapted for rotatably supporting each of said trunions on said body portion while preventing bodily movement of said trunions generally in the direction of relative telescopic collapse of said upper mast jacket section, said receptacle means thereby supporting said steering column assembly on said body portion for pivotal movement between a semi-installed position and a fully installed position, striker means disposed on one of said body portions and said upper mast jacket section, latch means disposed on the other of said body portion and said upper mast jacket section and adapted for automatic latching engagement on said striker means in response to pivotal movement of said steering column assembly from the semi-installed position to the fully installed position thereby to maintain said steering column assembly in the fully installed position, and means disposed between said upper mast jacket section and said body portion adapted for permitting longitudinal bodily shiftable movement of said upper mast jacket section in the direction of relative telescopic collapse thereof when said steering column assembly is in the fully-installed position.

3. The combination recited in claim 2 further including guide means on said body portion and on said steering column assembly adapted for aligning said steering column assembly in a predetermined longitudinally oriented vertical plane of said body portion when said steering column assembly achieves the fully-installed position thereof.

4. In a vehicle including a body portion, the combination comprising, a collapsible steering column assembly including a lower mast jacket section and an upper mast jacket section disposed on said lower section for telescopic collapse in an energy absorbing mode, means supporting one end of said lower mast jacket section on said body portion for pivotal movement between a semi-installed position and a fully-installed position, means on said body portion and on said lower mast jacket section adapted to prevent longitudinal bodily shiftable movement of said lower mast jacket section in the direction corresponding to relative telescopic collapse of said second mast jacket section, striker means rigidly disposed on said body portion and defining a cross bar section oriented in a plane normal to the longitudinal axis of said steering column assembly, a latch bolt defining a mouth portion, means supporting said latch bolt on said upper mast jacket section for pivotal movement between a latched position and an unlatched position, detent means on said upper mast jacket section engageable on said latch bolt for maintaining the latter in the latched position, said cross bar section with said latch bolt in the unlatched position being received in said latch bolt mount portion during movement of said steering column assembly from the semi-installed position to the fully-installed position so that said latch bolt is automatically pivoted to the latched position when said steering column assembly achieves the fully-installed position thereby to maintain said steering column assembly in the fully installed position, said latch bolt in the latched position thereof being oriented relative to said steering column assembly and said cross bar section such that said mouth portion permits unrestricted bodily shiftable movement of said upper mast jacket section in the direction of relative telescopic collapse of the latter.

5. The combination recited in claim 4 further including an alignment projection rigidly attached to one of said upper mast jacekt section and said body portion and an alignment receptacle rigidly attached to the other of said upper mast jacket section and said body portion, said projection being received in said receptacle during movement of said steering column assembly to the fully-installed position thereof for effecting alignment of the latter in a predetermined longitudinally oriented vertical plane of said body portion.

6. In a vehicle including a body portion, the combination comprising, a collapsible steering column assembly including a lower mast jacket section and an upper mast jacket section disposed on said lower mast jacket section for telescopic collapse in an energy absorbing mode, means disposed on said lower mast jacket section generally adjacent one end thereof defining a pair of rigid trunions on opposite sides of said lower mast jacket section oriented along an axis generally normal to the longitudinal axis of said steering column assembly, receptacle means disposed on said body portion and adapted for rotatably supporting each of said trunions on said body portion while preventing bodily movement of said trunions generally in the direction of relative telescopic collapse of said upper mast jacket section, said receptacle means thereby supporting said steering column assembly on said body portion for pivotal movement between a semi-installed position and a fully installed position, striker means rigidly disposed on said body portion and defining a cross bar section oriented in a plane normal to the longitudinal axis of said steering column assembly, a latch bolt defining a mouth portion, means supporting said latch bolt on said upper mast jacket section for pivotal movement between a latched position and an unlatched position, and detent means on said upper mast jacket section engageable on said latch bolt for maintaining the latter in the latched position, said cross bar section with said latch bolt in the unlatched position being received in said latch bolt mouth portion during movement of said steering column assembly from the semi-installed position to the fully-installed position so that said latch bolt is automatically pivoted to the latched position when said steering column assembly achieves the fully-installed position thereby to maintain said steering column assembly in the fully installed position, said latch bolt in the latched position thereof being oriented relative to said steering column assembly and said cross bar section such that said mouth portion permits unrestricted bodily shiftable movement of said upper mast jacket section in the direction of relative telescopic collapse of the latter.

* * * * *